United States Patent [19]
Konrad

[11] Patent Number: 5,347,741
[45] Date of Patent: Sep. 20, 1994

[54] ILLUMINATED FISHING ROD

[76] Inventor: John V. Konrad, 194 Hardenburg La., East Brunswick, N.J. 08816

[21] Appl. No.: 120,954

[22] Filed: Sep. 15, 1993

[51] Int. Cl.$^5$ ............................................. A01K 97/02
[52] U.S. Cl. ..................................... 43/17.5; 43/18.1
[58] Field of Search ................. 43/18.1, 17.5; 362/109

[56] References Cited

U.S. PATENT DOCUMENTS

| | | | |
|---|---|---|---|
| 2,152,385 | 3/1939 | Mayer | 362/109 |
| 3,535,018 | 10/1970 | Vasilatos | 42/17.5 |
| 4,085,437 | 4/1978 | Hrdlicka | 43/17.5 |
| 4,775,920 | 10/1988 | Seibert | 362/109 |
| 4,779,173 | 10/1988 | Carr | 362/109 |
| 4,780,980 | 11/1988 | McCullough | 43/18.1 |
| 5,182,873 | 2/1993 | Aragon | 43/17.5 |

FOREIGN PATENT DOCUMENTS

| | | | |
|---|---|---|---|
| 4222535 | 8/1992 | Japan | 43/18.1 |
| 2175781 | 12/1986 | United Kingdom | 43/18.1 |

Primary Examiner—P. Austin Bradley
Assistant Examiner—James Miner
Attorney, Agent, or Firm—Hugh E. Smith

[57] ABSTRACT

An illuminated fishing rod for fishing under poor ambient lighting conditions. The fishing rod includes a translucent and hollow rod coupled to a hollow handle. A light source coupled to a power source within the hollow handle is used for directing light to illuminate the translucent rod. A rotatable switch on the handle is used to activate the light source.

1 Claim, 4 Drawing Sheets

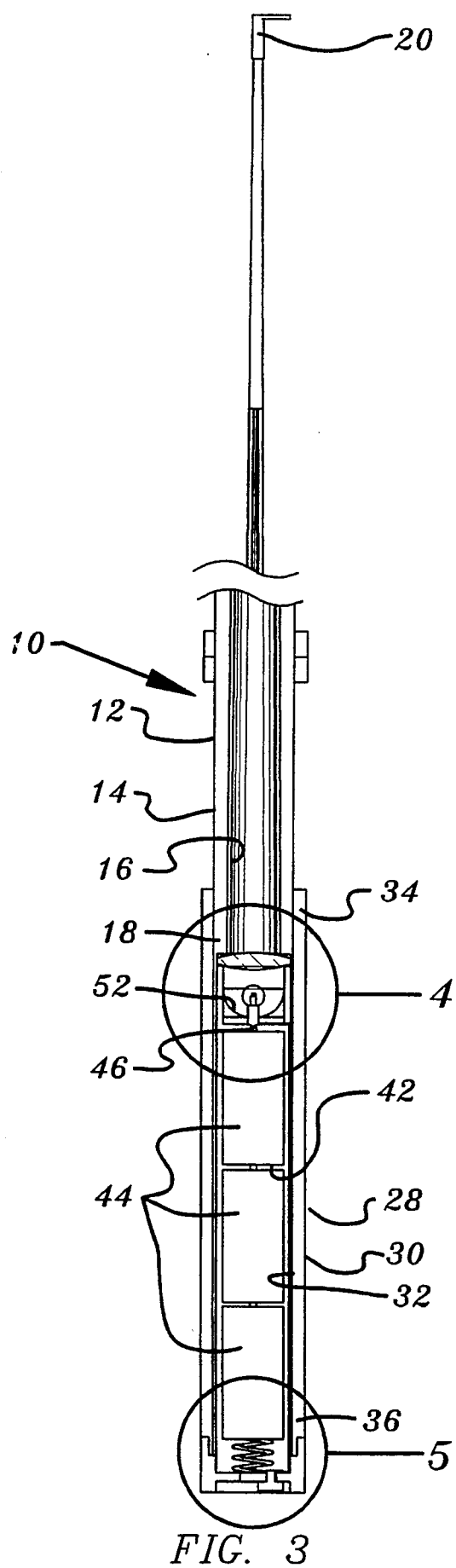
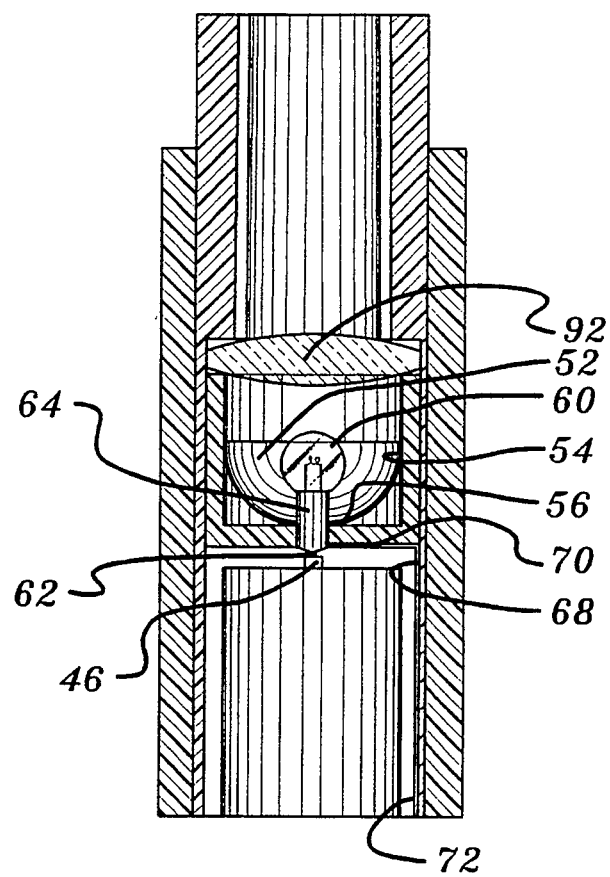
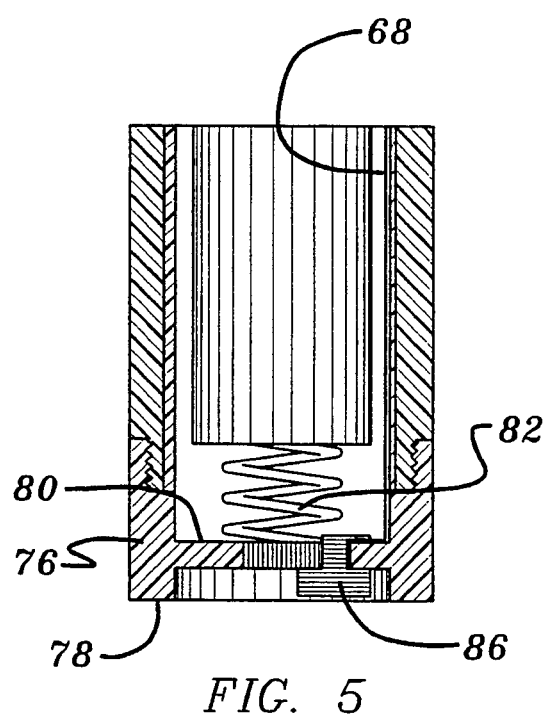
FIG. 3
FIG. 4
FIG. 5

ILLUMINATED FISHING ROD

BACKGROUND OF THE INVENTION

1. Field of the Invention

The present invention relates to an illuminated fishing rod and more particularly pertains to apparatus to allow fishing when ambient lighting conditions are poor.

2. Description of the Prior Art

The use of devices for illuminating fishing rods is known in the prior art. More specifically, devices heretofore devised and utilized for the purpose of illuminating fishing rods are known to consist basically of familiar, expected and obvious structural configurations, notwithstanding the myriad of designs encompassed by the crowded prior art which have been developed for the fulfillment of countless objectives and requirements.

For example, U.S. Pat. No. 4,750,287 to Myers; U.S. Pat. No. 4,780,980 to McCollough and U.S. Pat. No. 5,083,247 to Robinson each depict a fishing rod with illumination sources mounted on the fishing rod handle for directing light substantially in line with the rod and rod guides thereon.

Other patents of interest are U.S. Pat. No. Des.299,377 to Garcia and U.S. Pat. No. 4,178,712 to Williams. Each depicts a illumination source that may be externally mounted to the rod.

While these devices fulfill their respective, particular objective and requirements, the aforementioned patents do not describe a fishing rod comprising a hollow translucent rod that is internally illuminated by a light source in the handle. Furthermore, the prior art does not readily allow the rod to be illuminated at its tip, this characteristic proving to be valuable at night when trolling or when fishing from the shore using bottom baits.

In this respect, the illuminated fishing rod, according to the present inventions, substantially departs from the conventional concepts and designs of the prior art, and in so doing provides an apparatus primarily developed for the purpose of fishing under conditions of poor ambient lighting conditions.

Therefore, it can be appreciated that there exists a continuing need for new and improved illuminated fishing sticks. In this regard, the present invention substantially fulfills this need.

SUMMARY OF THE INVENTION

In view of the foregoing disadvantages inherent in the known types of fishing rod lighting systems now present in the prior art, the present invention provides an improved device for fishing under conditions of poor ambient lighting conditions. As such, the general purpose of the present invention, which will be described subsequently in greater detail, is to provide a new and improved illuminated fishing rod apparatus and method which has all the advantages of the prior art illuminated fishing rods and none of the disadvantages.

To attain this, the present invention is in a fishing rod adapted to be illuminated for fishing at night comprising, in combination, a fishing rod adapted to be illuminated for fishing at night comprising a hollow translucent rod having an exterior surface and interior surface, a base at one end, and a tip at the other end; the interior surface being coated with a reflective paint except adjacent to the tip, a plurality of guides positioned along the exterior surface and adapted to guide a fishing line from the base to the tip of the rod, a hollow handle having an exterior surface and an interior surface, a top end, and a bottom end, the exterior surface of the handle adapted for coupling a fishing reel thereto, the top end connected to the base of the rod, a power source positioned within the handle, the source having a positive end and a negative end, a reflector positioned within the handle between the top end of the handle and the positive end of the power source, the reflector having a concave reflective surface facing the top end of the handle, the reflector having a central opening; a light source having a conductive post and insulated collar disposed around the post, the collar of the light source positioned through the central opening of the reflector and adapted to be coupled to the positive and of the power source, an electrically conductive strip disposed between the power source and interior surface of the handle and having a front end and a rear end, the front end coupled to the post of the light source, a contact cap having an exterior surface and interior surface, the interior surface being electrically conductive and having an electrically conductive spring attached thereto, the interior surface adapted to be attached thereto, the interior surface adapted to be coupled to the conductive strip, the cap adapted to be coupled to the bottom end of the handle, whereby when the cap is coupled to the handle, the spring urges the power source into a position such that the negative end of the power source contacts the spring and the positive end of the power source contacts the post of the light source, a rotatable switch fixed to the exterior surface of the contact cap, whereby when the contact cap is coupled to the handle and the rotatable switch is rotated, the electrically conductive interior of contact cap engages with the conductive strip to activate the light sources, and a magnification lens positioned between the light source and the top end of the handle to intensify the light reflected from the reflector toward the base of the rod to illuminate the rod at the tip.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated fishing rod which may be easily and efficiently manufactured and marketed.

It is a further object of the present invention to provide a new illuminated fishing rod which is of durable and reliable construction.

An even further object of the present invention is to provide a new illuminated fishing rod which is susceptible of a low cost of manufacture with regard to both materials and labor, and which accordingly is then susceptible of low prices of sale to the consuming public, thereby making such a fishing rod economically available to the buying public.

Still yet another object of the present invention is to provide a new illuminated fishing rod which provides in the apparatuses and methods of the prior art some of the advantages thereof, while simultaneously overcoming some of the disadvantages normally associated therewith.

Still another object of the present invention is to illuminate a fishing rod that requires no external light source in order to view the rod under reduced visibility.

Yet another object of the present invention is to allow a fisherman to view the top of a fishing rod where the tip can be easily seen from a distance when trolling or when fishing from the shoreline with bottom baits.

Lastly, it is an object of the present invention to provide an illuminated fishing rod comprising of a translucent and hollow rod; a handle coupled to the hollow rod; a light source disposed within the handle and adapted for directing light to the hollow rod; a power source disposed within the handle; and a rotatable switch disposed on the handle, the switch coupling the power source to the light source, whereby when the switch is rotated, the light source is activated and the hollow rod is illuminated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged cross sectional view of the handle portion of the fishing rod of the prior figures.

FIG. 4 is an enlarged cross sectional view of a portion of the handle circled as region 4 of FIG. 3.

FIG. 5 is an enlarged cross sectional view of the handle near the cap circled as region 5 of FIG. 3.

DESCRIPTION OF THE PREFERRED EMBODIMENT

Figures 1, 2:
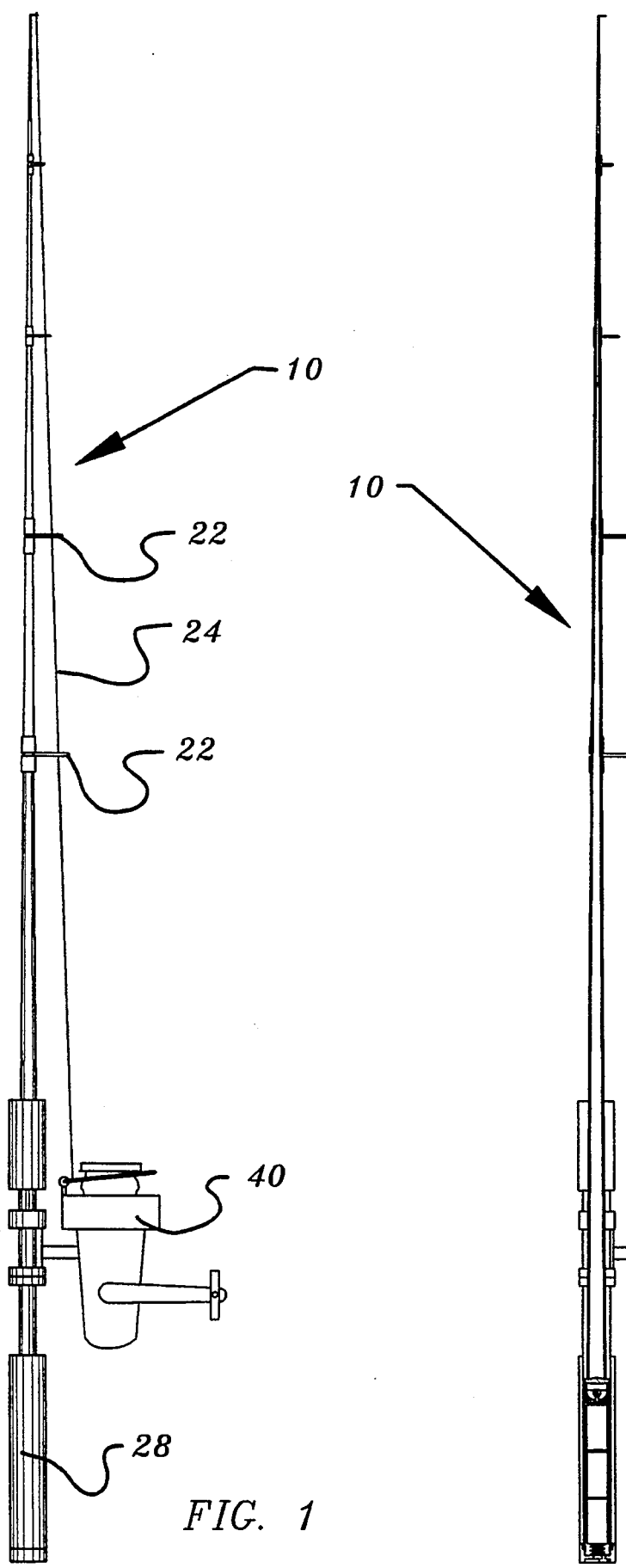
FIG. 1 is a side elevational view of the illuminated fishing rod constructed in accordance with the principles of the present invention.
FIG. 2 is a cross sectional view of the illuminated fishing rod of FIG. 1.

With reference now to the drawings, and in particular to FIGS. 1-5 thereof, a new illuminated fishing pole embodying the principles and concepts of the present invention and generally designated by the reference numeral 10 will be described.

More specifically, the illuminated fishing rod 10 is adapted to be illuminated for fishing at night. It comprises a hollow translucent rod 12 having an exterior surface 14 and interior surface 16. It also includes a base 18 at one end and a tip 20 at the other end. The rod 10 further has a plurality of guides 22 positioned along the exterior surface 14. The guides 22 are adapted to guide a fishing line 24 from the base to the tip 20.

A hollow handle 28 is part of the rod 10. The handle has an exterior surface 30 and interior surface 32. It also has a top end 34 and a bottom end 36 which is connected to the base 18 of the rod 10. The exterior surface 30 of the handle 28 is adapted for coupling a fishing reel 40 thereto.

A power source 44 is positioned within the handle 28. The source has a positive end 46 or anode and a negative end 48 or cathode. A reflector 52 is positioned within the handle 28 between the top end 34 of the handle 28 and the positive end 48 of the power source. The reflector 52 has a concave reflective surface 54 facing the top end 34 of the handle 28 and a central opening 56 therethrough.

A light source 60 is provided having a conductive post 62 with an insulated collar 64 coupled therearound. The collar 64 is positioned through the central opening 56 of the reflector 52 and is adapted to be coupled to the positive end 46 of the power source 44. An electrically conductive strip 68 having a front end 70 and a rear end 72 is disposed between the power source 44 and interior surface 32 of the handle 28. The front end 70 is coupled to the post 62 of the light source 60.

A contact cap 76 has an exterior surface 78 and interior surface 80 and is adapted to be coupled to the bottom end 36 of the handle. The interior surface 80 of cap 76 is electrically conductive and has an electrically conductive spring 82 connected thereto. The interior surface 80 of the cap 76 is adapted to be coupled to the conductive strip 68. The cap 76 is adapted to be coupled to the bottom end 36 of the handle 28, whereby when the cap 76 is coupled to the handle 28, the spring 82 urges the power source 44 into a position such that the negative end 48 of the power source 44 contacts the spring 82, and the positive end 46 of the power source 44 contacts the post 62 of the light source 60.

A rotatable switch 86 is fixed to the exterior surface of the contact cap 76. When the contact cap 76 is coupled to the handle 28 and the rotatable switch 86 is rotated, the electrically conductive interior surface 80 of contact cap 76 engages with the conductive strip 68 to activate the light source 60, illuminating the rod tip 20 by light rays from source 60 reflection, up the length of the interior surface 16 of the rod 12 which has been coated with a reflective paint 90 except at the tip 20 whereat illumination occurs.

In addition, a magnification lens 92 is positioned between the light source 60 and the top end 34 of the handle 28. The lens 92 functions to intensify the light reflected from the reflector 52 toward the base 18 of the rod 12 to illuminate the tip 20 of the rod 10.

Figures 6, 7:
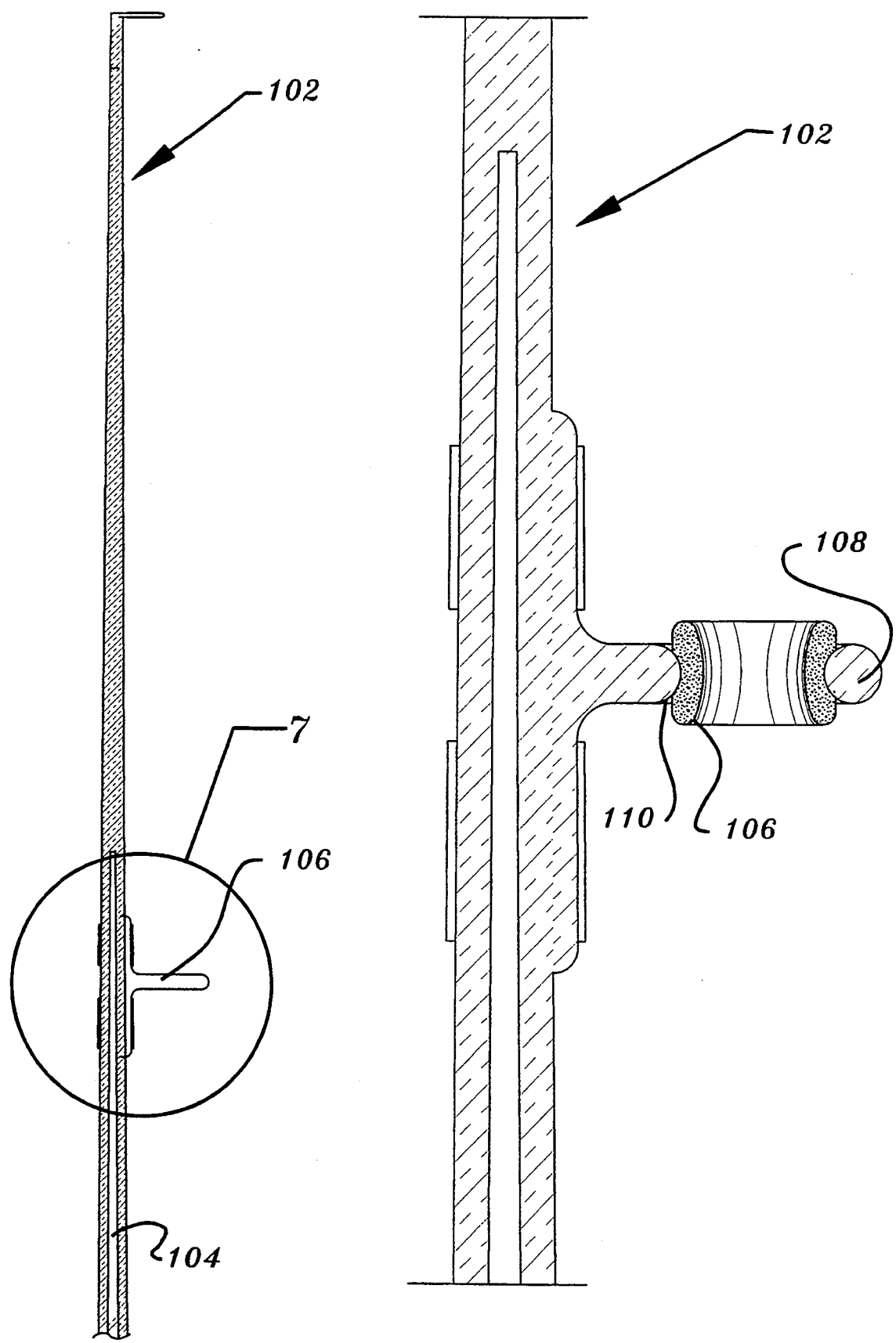
FIG. 6 is a cross sectional view of an illuminate fishing rod constructed in accordance with an alternate embodiment of the invention.
FIG. 7 is an enlarged cross sectional view of a portion of the rod having a fishing line guide connected thereto circled as region 7 of FIG. 6.

Shown in FIGS. 6 and 7 is an alternate embodiment of the present invention. According to the alternate embodiment, a modified fishing rod 102 is utilized. The fishing rod of the alternate embodiment is fabricated of fiber optic strands in an elasticmetric matrix. Such a configuration for the fishing rod allows for coupling of the rod to a conventional handle assembly as that of the prior embodiment. The handle assembly including a light source with a reflector and lens as shown in FIG. 3 but with the hollow rod 12 fabricated of a conventional material, the rod is fabricated of the fiber optics strands. A central extent of the rod 102 is hollow adjacent to the handle and forming a cavity extending from the handle to a location above the most outboard of the line guides 106. The line guide 106 is typical of those used in commercially available fishing rods such as a torus shaped member of a ceramic material. The fiber optic strands of the fishing rod extend to the support for the guide located radially outwardly from the access of the main portion of the rod 102. This outwardly extending portion 108 forms an aperture 110 in which is fitted the ceramic guide. In this manner, the entire fishing rod rather than merely the tip is illuminated. Further, the illumination extends into that portion of the fishing rod supporting the ceramic lines guides 106. Any number of such lines guides might be utilized and each individually would be illuminated during the illumination of the fishing rod.

Figures 8, 9:
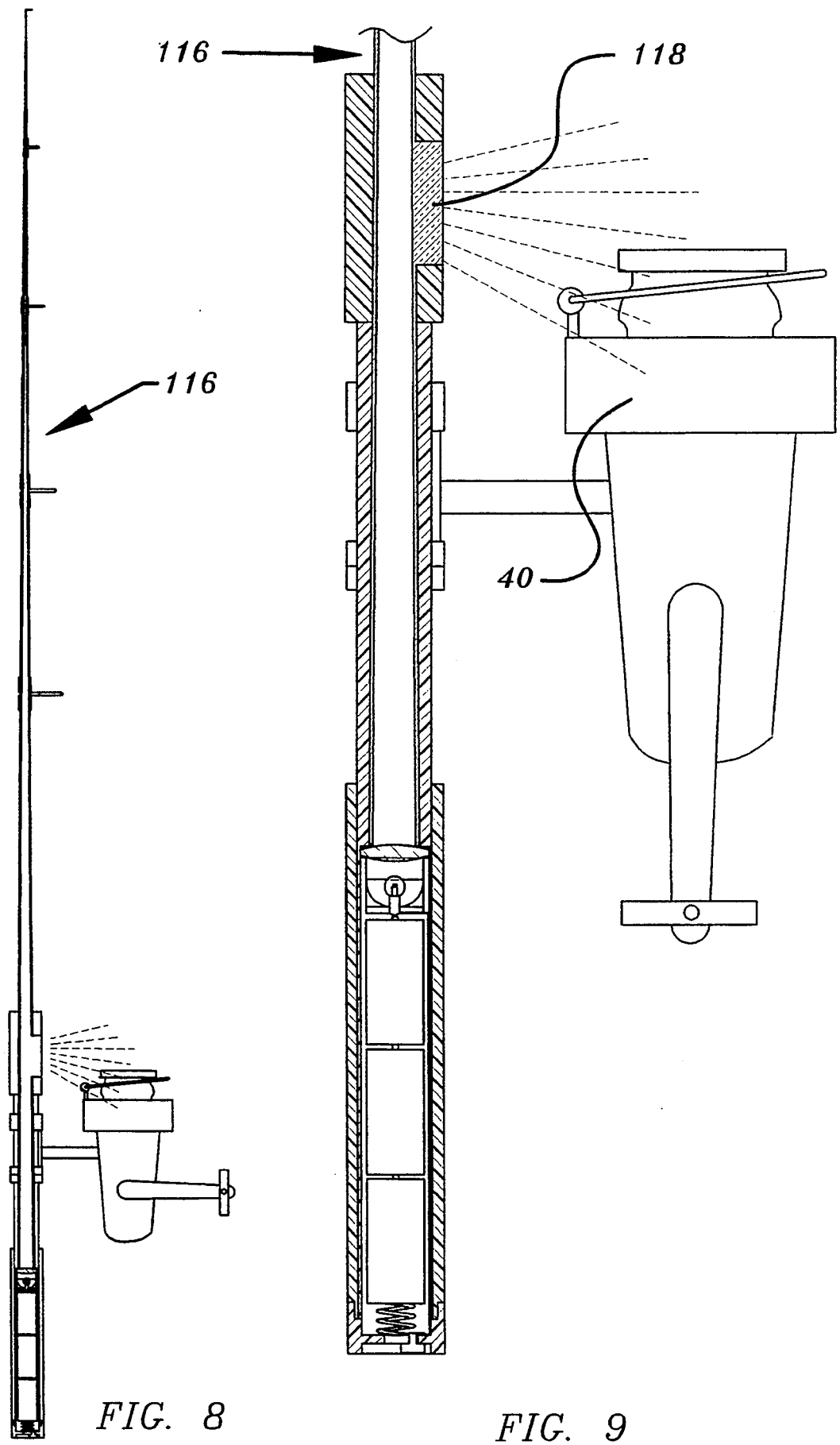
FIG. 8 is a side elevational view of an illuminated fishing rod constructed with a further alternate embodiment of the invention.
FIG. 9 is an enlarged cross sectional view of the handle region of the illuminated fishing rod of FIG. 8.

The final embodiment of the present invention is shown in FIGS. 8 and 9. In such embodiment, the rod 116 is more similar to that of the embodiment of FIGS. 1-5. Specifically, the rod is formed hollow from the handle end to a location adjacent to the tip. Reflective paint on the interior surface of the opening within the rod allows the light to be reflected upwardly from the source by the reflector to the lens up to the tip, the only location where the fishing rod is illuminated. Unlike any of the other embodiments, a region of the fishing rod adjacent to the reel 40 is provided with a transparent piece 118. The transparent piece is preferably of a transparent or, in the alternate, a translucent piece of elastic material for greater durability. The transparent piece 118 extends from the exterior surface of the fishing rod wall to a location adjacent to the aperture extending the length of the rod. No reflective paint is located on the interior surface of the rod at this location. In this manner, light generated from the bulb will illuminate the tip only plus that region of the rod at the transparent piece 118. This in turn would illuminate the reel of the fishermen for greater convenience during night time fishing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod adapted to be illuminated for fishing at night comprising:

a hollow translucent rod having an exterior surface and interior surface, a base at one end, and a tip at the other end;

a plurality of guides positioned along the exterior surface and adapted to guide a fishing line from the base to the tip of the rod;

a hollow handle having an exterior surface and an interior surface, a top end, and a bottom end, the exterior surface of the handle adapted for coupling a fishing reel thereto, the top end connected to the base of the rod;

a power source positioned within the handle, the source having a positive end and a negative end;

a reflector positioned within the handle between the top end of the handle and the positive end of the power source, the reflector having a concave reflective surface facing the top end of the handle, the reflector having a central opening;

a light source having a conductive post and insulated collar disposed around the post, the collar of the light source positioned through the central opening of the reflector and adapted to be coupled to the power source;

an aperture formed in the rod between the base and the adjacent guide in proximity to the area for coupling of a fishing reel, and with a translucent block located within the aperture, and with a coating of a reflective paint on the interior surface but not on the block whereby light may be reflected into the rod from the reel for illuminating the region exterior of the block;

an electrically conductive strip disposed between the power source and interior surface of the handle and having a front end and a rear end, the front end coupled to the post of the light source;

a contact cap having an exterior surface and interior surface, the interior surface being electrically conductive and having an electrically conductive spring attached thereto, the interior surface adapted to be attached thereto, the interior surface adapted to be coupled to the conductive strip, the cap adapted to be coupled to the bottom end of the handle, whereby when the cap is coupled to the handle, the spring urges the power source into a position such that the negative end of the power source contacts the spring and the positive end of the power source contacts the post of the light source;

a rotatable switch fixed to the exterior surface of the contact cap, whereby when the contact cap is coupled to the handle and the rotatable switch is rotated, the electrically conductive interior of contact cap engages with the conductive strip to activate the light sources; and a magnification lens positioned between the light source and the top end of the handle to intensify the light reflected from the reflector toward the base of the rod.

* * * * *